Oct. 13, 1959     J. A. MACK ET AL     2,908,469
BRACKET FOR MOUNTING ARTICLES UPON A POLE
Filed Feb. 19, 1957     2 Sheets-Sheet 1

INVENTORS.
Andrew A. Hocker
Jules A. Mack
BY
Webb, Mackey & Burden
THEIR ATTORNEYS INVENTORS.
Andrew A. Hocher
Jules A. Mack
BY
Webb, Mackey & Burden
THEIR ATTORNEYS

# United States Patent Office 2,908,469
Patented Oct. 13, 1959

2,908,469

BRACKET FOR MOUNTING ARTICLES UPON A POLE

Jules A. Mack and Andrew A. Hocher, Pittsburgh, Pa., assignors to Hubbard and Company, Pittsburgh, Pa., a corporation of Pennsylvania Application February 19, 1957, Serial No. 641,144

9 Claims. (Cl. 248—230)

This invention relates to a bracket for mounting articles upon a pole and more particularly to a bracket which can mount one or more devices such as transformers, capacitors, circuit breakers, reclosures, etc. upon a utility pole.

Many utility poles which support electric power and/or telephone lines require at least one bracket for mounting or securing thereto electrical devices which are essential components of electric power and telephone transmission system. An ever increasing demand for more electric power and for greater telephone communication requires an increased number of electrical devices which must be mounted upon utility poles. To secure these electrical devices upon utility poles calls for brackets which can be quickly and easily secured to the pole and which can safely support electrical devices, some of which weigh several tons. In recent years, the size of these electrical devices has increased commensurate with increased demand for power and for telephone communication and with the greater number of users. Consequently, utility companies have sought a bracket which can safely support not only larger and heavier electrical devices, but also a plurality of these devices upon a single bracket. In addition, the companies have need for a bracket which can be quickly and easily installed.

We have invented a bracket for mounting a plurality of electrical devices upon a utility pole which fulfills the requirements of the electric power and telephone companies. Specifically, our bracket comprises at least two or three bearing plates spaced apart and adapted to embrace the periphery of a utility pole. Each bearing plate has a bearing surface which engages the periphery of the pole and at least one of the bearing plates has a hanger affixed thereto. The hanger extends outwardly away from the bearing surface and is adapted for mounting an electrical device thereupon, preferably at its outer end. For each bearing plate there is a pair of ears with each ear of a pair having one of its ends affixed rigidly relative to the bearing plate and the hanger and having the other end extending outwardly away from the bearing surface and extending divergently away from the other ear. The ears are arranged so that each ear of a pair on one bearing plate forms an adjacent pair with an ear on an adjacent bearing plate. Each ear of a pair associated with a bearing plate with a hanger has its rigidly affixed end connected to said hanger and has a wing interposed between said ear and the hanger, with the wing extending along the ear and along the hanger and being affixed therebetween. Cooperating means such as a turnbuckle extends between each adjacent pair of ears and is connected to each ear of an adjacent pair. The turnbuckle tightens or loosens the bracket upon the pole.

In the accompanying drawings, we have shown two preferred embodiments of our invention in which.

Figure 1:
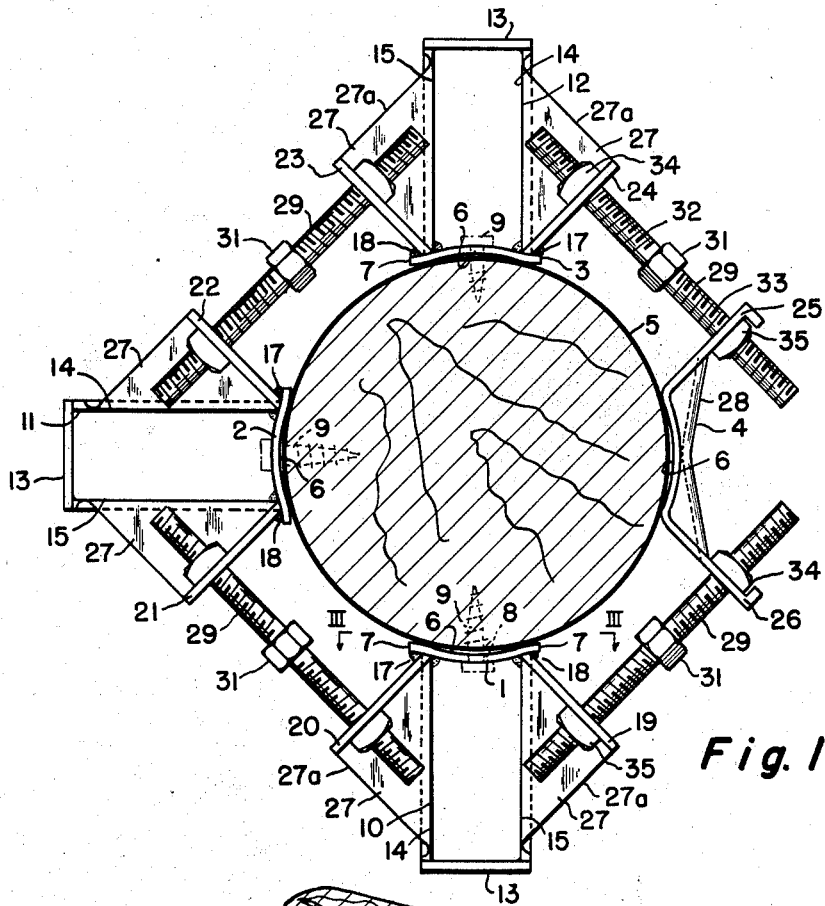
Figure 1 is a plan view of one embodiment of our bracket mounted upon a utility pole.
Figure 2:
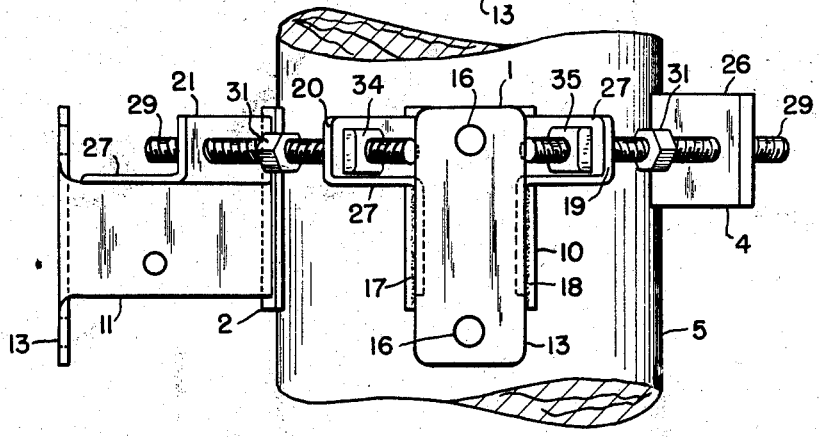
Figure 2 is a side elevation view of the bracket of Figure 1.
Figure 3:
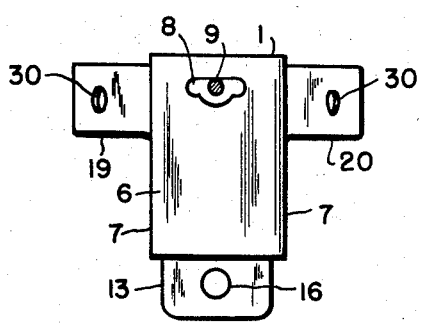
Figure 3 is a section view along the line III—III of Figure 1.

Referring to Figures 1–3 inclusive, our bracket comprises four bearing plates, 1, 2, 3, and 4, equally spaced apart and embracing a utility pole 5. Each bearing plate has a bearing surface 6 which engages the periphery of the pole and at each end thereof, a small lip 7 which prevents the edges of the bearing plate from digging into the outer surface of the pole when the bracket is mounted upon it.

A T-shaped slot 8 in the upper end of bearing plate 1 receives a lag screw 9 which supports the bracket upon the pole during its attachment thereto. The lag screw also supports the bracket once it has been mounted upon a pole and during securing of an electrical device to the mounting. The head of the T-slot permits small adjustments for locating the bearing plate 1 around the pole periphery in the event that one or more of the bearing plates require repositioning.

Bearing plates 1, 2, and 3 have hangers 10, 11, and 12 respectively affixed thereto for supporting an electrical device thereon. As shown, each hanger extends outwardly away from the bearing plate and its bearing surface. The hangers are located so that the longitudinal axis of each lies in a plane disposed radially relative to the axis of the pole.

Each hanger comprises a mounting plate 13 and two connecting members 14 and 15, each interposed between the mounting plate and a bearing plate with one end of each connecting member affixed to the bearing plate and the other end thereof secured to the mounting plate. Each mounting plate has a pair of holes 16 for receiving attaching bolts (not shown) which connect an electrical device thereto.

As shown in Figure 1, welds 17 and 18 affix each connecting member to its bearing plate. Each weld is located at the intersection of the connecting member and the bearing plate on the side of the connecting member furthest from the center of the bearing plate. The welds extend throughout the height of the connecting member.

Each bearing plate has a pair of ears with plate 1 having ears 19 and 20; plate 2, ears 21 and 22; plate 3, ears 23 and 24; and plate 4, ears 25 and 26. Each ear of a pair has one end affixed rigidly relative to a connecting member of a hanger and its bearing plate. The other end of each ear of a pair extends outwardly away from the bearing plate and also extends divergently away from the other ear of a pair.

Ears 19 and 20, 21 and 22, and 23 and 24 straddle hangers 10, 11, and 12 respectively and extend outwardly away from their connecting members with each ear having its rigidly affixed end secured to a connecting member of its respective hanger adjacent the intersection of the connecting member and its bearing plate.

As shown in Figure 1, ears 19, 20, 21, 22, 23, and 24 intersect their respective connecting member at an angle of substantially 45°.

Interposed between each ear straddling a hanger and the connecting member to which it is connected is a triangular shaped wing 27 affixed between the ear and the connecting member. The wing extends both along the ear and along the connecting member as shown in Figure 1 and has a side 27a which intersects the connecting member at an angle of substantially 45° and is perpendicular to the ear.

Ears 25 and 26 of bearing plate 4 which has no hanger connected thereto, are an integral part of that bearing plate. A bracing rib 28 supports the ears 25 and 26 and has one end connected to each ear with its center portion secured to the bearing plate.

Each ear of a pair associated with a bearing plate forms an adjacent pair with an ear on an adjacent bearing plate. For example, ear 20 on bearing plate 1 forms an adjacent pair with ear 21 on adjacent bearing plate 2 and correspondingly, ears 22 and 23, 24 and 25, and 26 and 19 comprise adjacent pairs. As shown, the ears of each adjacent pair are parallel to one another.

Disposed between each ear of an adjacent pair is a turnbuckle bolt 29 which registers with a hole or bore 30 in each ear. The turnbuckle bolt 29 has an adjustment nut 31 at substantially its midpoint and has left-hand threads 33 on one side of the adjustment nut and right-hand threads 32 on the other side thereof whereby wrenching the turnbuckle bolt downwardly viewing Figure 2 draws an adjacent pair of ears together and wrenching upwardly moves the adjacent pair of ears away from one another. Fitted on the right-hand and left-hand threads of the turnbuckle are nuts 35 and 34 which engage the ears of the bearing plates.

To render our bracket suitable for mounting upon a wide range of pole diameters, we locate the turnbuckle bolts near the outer ends of the adjacent pairs of ears between which they extend and also position the ears and turnbuckle bolts so that for small diameter poles, the ends of the turnbuckle bolts extend above and across the connecting members of the hangers.

As shown in Figure 1, each turnbuckle bolt is disposed between an adjacent pair of ears so that its longitudinal axis is substantially perpendicular to each ear of an adjacent pair. The longitudinal axis of each turnbuckle bolt is also disposed at an angle of substantially 45° relative to the connecting members of each hanger. Projections of the longitudinal axis of the turnbuckle bolts 29 intersect the radial plane of the longitudinal axis of the hangers at an acute angle and at a point adjacent the mounting plate of each hanger. For the bracket of Figure 1, the acute angle is substantially 45°.

To assemble our bracket upon a utility pole such as pole 5, the bearing plates are positioned to form a circle embracing the pole periphery following which the turnbuckle bolts are inserted between adjacent pairs of ears formed by the positioning of the bearing plates. Next, the nuts are fitted on the right-hand and left-hand threads. Position of the nuts upon the right-hand and left-hand threads of the turnbuckle bolts determines the amount of spread of the bracket for any given position of the nuts upon the turnbuckle bolt threads. Expanding the bracket components to the maximum permitted by the initial position of the nuts traps these nuts to their respective ears. Wrenching the adjustment nut of each turnbuckle bolt loosens or tightens the bracket upon the pole depending upon direction of rotation of the bolt about its longitudinal axis.

Figure 4:
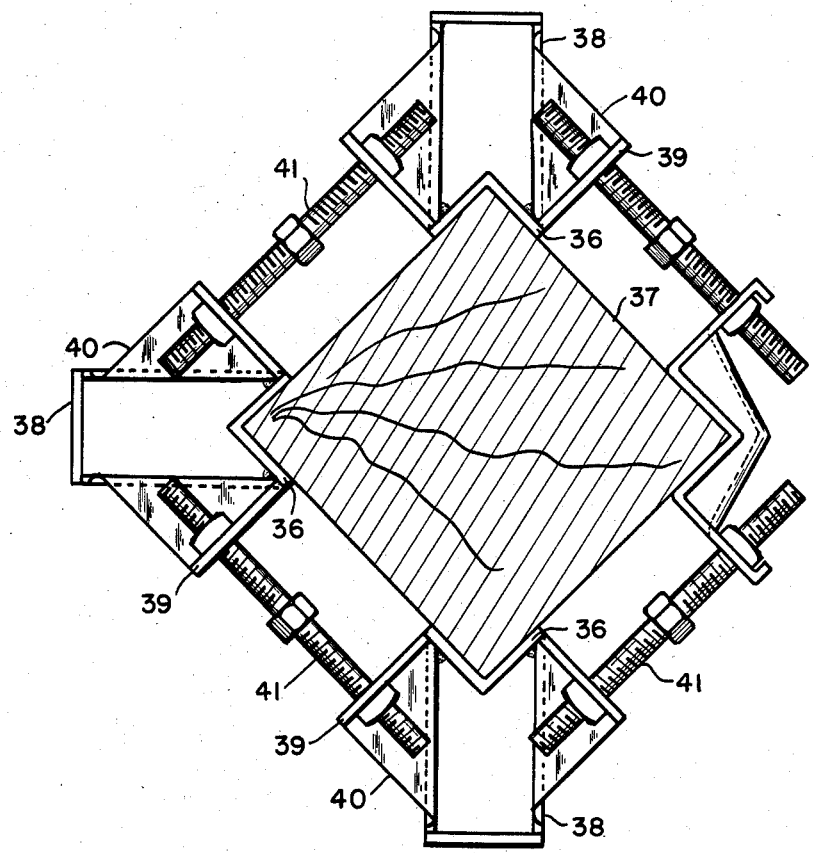
Figure 4 is a plan view of a second embodiment of our invention.

Figure 4 shows a modification of our invention with the bracket being adapted for mounting upon a square or rectangular shaped pole. The bearing plates 36 of this embodiment are made from angles which engage the corners of the square shaped pole 37. The hangers 38, ears 39, wings 40, and turnbuckle bolts 41 of this embodiment have the same structure and disposition as the hangers, ears, wings, and turnbuckle bolts previously described.

When an electrical device such as a transformer is affixed to the mounting plate of a hanger, its weight exerts a bending moment comprising a force equal to the weight of the transformer and a moment arm equal to the length of the hanger. This bending moment pivots about the lower ends of the connecting members of the hanger at their intersection with the bearing plate and thus effects a binding or clamping action of our bracket to the pole periphery. In other words, this bending moment generates a clamping pressure along the lower edge of the bearing plate which carries an electrical device on the hanger secured thereto and causes the bearing plate to grip the pole periphery along its lower edge. The magnitude of the clamping pressure exerted by the bending moment is dependent upon the load applied to the mounting plate of the hanger, i.e., the weight of the electrical device. Hence, the greater the load applied to the mounting plate, the greater is the clamping pressure of the bracket.

Figure 5:
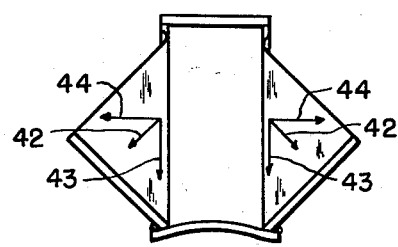
Figure 5 is a vector diagram showing forces acting upon the ears, wings, and connecting members of our bracket.

The structure and disposition of the ears, wings, and turnbuckle bolts of our bracket perform important functions which materially strengthen our bracket and render it able to withstand these bending moments. One of the important functions is providing a force which opposes the bending moment arising from securing an electrical device upon the mounting plate. This force results from wrenching the turnbuckle bolts to tighten the bracket upon the pole whereby the turnbuckle bolts exert a force which pulls the ears of an adjacent pair toward one another. Thus, the turnbuckle bolt subjects the ears, wings, and connecting members of a hanger to tension forces. Figure 5 shows these tension forces as represented by an arrow 42 and shows their components as represented by arrows 43 and 44. Since each ear, wing, and connecting member of a hanger are connected together or are integral parts of a hanger, the wings and connecting members are subjected to the same tension forces as the ears themselves. Consequently, component 43 of the tension force subjects each of the connecting members to a force which tends to pull the hanger into its bearing plate. This component 43 opposes the bending moment arising from mounting a transformer or electrical device upon the mounting plate of the hanger. In view of the forces 42, 43 and 44 in our bracket, welds 17 and 18 function primarily to link the connecting members of each hanger to its bearing plate and are not required for conferring optimum performance characteristics upon the bracket. Thus, our bracket is not dependent upon the welds 17 and 18 for its maximum strength.

A second important function comprises subjecting welds 17 and 18 to compression forces generated by force 42 rather than to tension forces which tend to weaken and sometimes rupture welds. This second function also arises from the turnbuckle bolts placing the ears under tension when the bracket is tightened around a pole's periphery. Since the turnbuckle bolts subject both ears of an adjacent pair to tension and since each ear is connected to or is integral with a wing and its respective connecting member, the tension force exerted by the turnbuckle bolt places the welds under compressive forces by exerting a bending moment upon the ears and hence, the connecting members of the hangers. This bending moment is pivoted at the intersection of the connecting member and the bearing plate and comprises the tension exerted by the turnbuckle bolt as the force and the ear as the moment arm.

A third important function is reinforcing each of the connecting members of a hanger by extending each wing along its respective connecting member as shown in Figure 1 so that the connecting member resists buckling along its longitudinal axis when the force 43 is applied.

Our bracket has excellent performance characteristics which render it highly desirable for electric power and telephone transmission systems. In the first place, its structure and disposition of components enables it to safely support, with a minimum deflection of components, heavier electrical devices than other comparable types of brackets heretofore employed.

In the second place, our bracket has good versatility in that it is suitable for mounting upon a wide range of pole diameters, namely, a range from about 6″ diameters to and including 16″ diameters.

In the third place, our bracket can be quickly and easily mounted upon a pole with a minimum of adjustments of its parts.

While we have described present preferred embodiments of our invention, it is to be understood that it may be otherwise embodied within the scope of the appended claims.

We claim:

1. A bracket for mounting articles upon a pole comprising at least three bearing plates spaced apart and adapted to embrace the periphery of a pole, each bearing plate having a bearing surface adapted to engage the periphery of said pole, at least one of said bearing plates having a hanger affixed thereto, said hanger extending outwardly away from said bearing surface, having at least one side wall and being adapted for mounting an article thereupon, a pair of ears for each bearing plate with each ear of a pair having one of its ends affixed rigidly relative to said bearing plate and said hanger and having the other end extending outwardly away from said bearing surface, said ears being arranged so that each ear of a pair on one bearing plate forms an adjacent pair with an ear on an adjacent bearing plate, each ear of a pair associated with a bearing plate with a hanger having its rigidly affixed end connected to said side wall of the hanger and having a wing interposed between said ear and said side wall of the hanger, said wing extending between an upper part of said side wall and said ear, extending along said ear and along said side wall and being affixed therebetween, and cooperating means extending between each adjacent pair of ears, being connected to each ear thereof and being adapted to tighten or loosen said bracket upon the pole.

2. A bracket for mounting articles upon a pole comprising at least three bearing plates spaced apart and adapted to embrace the periphery of a pole, each bearing plate having a bearing surface adapted to engage the periphery of said pole, at least one of said bearing plates having a hanger affixed thereto, said hanger extending outwardly away from said bearing surface, having at least one side wall and being adapted for mounting an article thereupon, a pair of ears for each bearing plate with each ear of a pair having one of its ends affixed rigidly relative to said bearing plate and said hanger and having the other end extending outwardly away from said bearing surface, said ears being arranged so that each ear of a pair on one bearing plate forms an adjacent pair with an ear on an adjacent bearing plate, each ear of a pair associated with a bearing plate with a hanger having its rigidly affixed end connected to said side wall of the hanger and having a wing interposed between said ear and said side wall of the hanger, said wing extending between an upper part of said side wall and said ear, extending along said ear and along said side wall and being affixed therebetween, and cooperating means extending between each adjacent pair of ears, being connected to each ear thereof and being adapted to tighten or loosen said bracket upon the pole, at least one of said cooperating means being a turnbuckle means.

3. The apparatus of claim 1 characterized by said hanger having its longitudinal axis lying in a plane disposed radially relative to the axis of said pole, and by each cooperating means being disposed relative to each adjacent pair of ears between which it extends so that a projection of its longitudinal axis intersects said radially disposed plane at an acute angle.

4. A bracket for mounting articles upon a pole comprising at least three bearing plates spaced apart and adapted to embrace the periphery of a pole, each bearing plate having a bearing surface adapted to engage the periphery of said pole, at least one of said bearing plates having a hanger affixed thereto, said hanger comprising a mounting plate adapted for mounting an article thereupon, and at least one connecting side member extending between said mounting plate and said bearing plate and being affixed therebetween, said hanger extending outwardly away from said bearing surface, a pair of ears for each bearing plate with each ear of a pair having one of its ends affixed rigidly relative to said bearing plate and said connecting side member and having the other end extending outwardly away from said bearing surface and extending divergently away from the other ear, said ears being arranged so that each ear of a pair on one bearing plate forms an adjacent pair with an ear on an adjacent bearing plate, each ear of a pair associated with a bearing plate with a hanger having its rigidly affixed end connected to a connecting member and having a wing interposed between said ear and said connecting side member, said wing extending between an upper part of said connecting side member and said ear, extending along said ear and along said connecting side member and being affixed therebetween, and a turnbuckle means extending between each adjacent pair of ears and through each ear of an adjacent pair so that operation of said turnbuckle means tightens or loosens said bracket upon the pole depending upon direction of rotation thereof said turnbuckle means including a nut disposed thereon at each end thereof and located on the side of an ear opposite that side which faces the other ear of an adjacent pair, said turnbuckle means extending through those ears affixed to a wing adjacent to a surface of said wing so that said nut is trapped by said wing.

5. A bracket for mounting articles upon a pole comprising at least three bearing plates spaced apart and adapted to embrace the periphery of a pole, each bearing plate having a bearing surface adapted to engage the periphery of said pole, at least one of said bearing plates having a hanger affixed thereto, said hanger comprising a mounting plate adapted for mounting an article thereupon, and at least one connecting side member extending between said mounting plate and said bearing plate and being affixed therebetween, said hanger extending outwardly away from said bearing surface, a pair of ears for each bearing plate with each ear of a pair having one of its ends affixed rigidly relative to said bearing plate and said connecting side member and having the other end extending outwardly away from said bearing surface, said ears being arranged so that each ear of a pair on one bearing plate forms an adjacent pair with an ear on an adjacent bearing plate, each ear of a pair associated with a bearing plate with a hanger having a wing interposed between said ear and said connecting side member, said wing extending between an upper part of said connecting side member and said ear, extending along said ear and along said connecting side member and being affixed therebetween, and a turnbuckle means extending between each adjacent pair of ears and through each ear of an adjacent pair so that operation of said turnbuckle means tightens or loosens said bracket upon the pole depending upon direction of rotation thereof, said turnbuckle means including a nut disposed thereon at each end thereof and located on the side of an ear opposite that side which faces the other ear of an adjacent pair, said turnbuckle means extending through those ears affixed to a wing adjacent to a surface of said wing so that said nut is trapped by said wing.

6. The apparatus of claim 5 characterized by said hanger having its longitudinal axis lying in a plane disposed radially relative to the axis of said pole, and by each turnbuckle means being disposed relative to each adjacent pair of ears between which it extends so that a projection of its longitudinal axis intersects said radially disposed plane at an acute angle.

7. A bracket for mounting articles upon a pole comprising four bearing plates spaced apart and adapted to embrace the periphery of a pole, each bearing plate having a bearing surface adapted to engage the periphery of said pole, at least one of said bearing plates having a hanger affixed thereto, said hanger comprising a mounting plate adapted for mounting an article thereupon and at least one connecting side member extending between said mounting plate and said bearing plate and being affixed therebetween, said hanger extending outwardly away from said bearing surface and having its longitudinal axis lying in a plane disposed radially relative to the axis of said pole, a pair of ears for each bearing plate with each ear of a pair having one of its ends affixed rigidly relative to said bearing plate and said connecting side member and having the other end extending outwardly away from said bearing surface, said ears being arranged so that each ear of a pair on one bearing plate forms an adjacent pair with an ear on an adjacent bearing plate, each ear of a pair associated with a bearing plate with a hanger having a wing interposed between said ear and said connecting side member, said wing extending between an upper part of said connecting side member and said ear, extending along said ear and along said connecting side member and being affixed therebetween, and a turnbuckle means extending between each adjacent pair of ears and being connected to each ear thereof so that operation of said turnbuckle means tightens or loosens said bracket upon the pole depending upon direction of rotation thereof, each turnbuckle means being disposed relative to each adjacent pair of ears between which it extends so that its longitudinal axis intersects each ear of an adjacent pair at substantially right angles thereto and so that a projection of said longitudinal axis of each turnbuckle means intersects said radially disposed plane at an angle of substantially 45°.

8. A bracket for mounting articles upon a pole comprising at least two bearing plates spaced apart and adapted to embrace the periphery of a pole, each bearing plate having a bearing surface adapted to engage the periphery of said pole, at least one of said bearing plates having a hanger affixed thereto, said hanger extending outwardly away from said bearing, having at least one side wall surface and being adapted for mounting an article thereupon, a pair of ears for each bearing plate with each ear of a pair having one of its ends affixed rigidly relative to said bearing plate and said hanger and having the other end extending outwardly away from said bearing surface, said ears being arranged so that each ear of a pair on one bearing plate forms an adjacent pair with an ear on an adjacent bearing plate, each ear of a pair associated with a bearing plate with a hanger having a wing interposed between said ear and said side wall of the hanger, said wing extending between an upper part of said side wall and said ear, extending along said ear and along said side wall and being affixed therebetween, and cooperating means extending between each adjacent pair of ears, being connected to each ear thereof and being adapted to tighten or loosen said bracket upon the pole.

9. A bracket for mounting articles upon a pole comprising at least three bearing plates spaced apart and adapted to embrace the periphery of a pole, each bearing plate having a bearing surface adapted to engage the periphery of said pole, at least one of said bearing plates having a hanger affixed thereto, said hanger extending outwardly away from said bearing surface, having at least one side wall and being adapted for mounting an article thereupon, a pair of ears for each bearing plate with each ear of a pair having one of its ends affixed rigidly relative to said bearing plate and said hanger and having the other end extending outwardly away from said bearing surface, said ears being arranged so that each ear of a pair on one bearing plate forms an adjacent pair with an ear on an adjacent bearing plate, each ear of a pair associated with a bearing plate with a hanger having a wing interposed between said ear and said side wall of the hanger, said wing extending between an upper part of said side wall and said ear, extending along said ear and along said side wall and being affixed therebetween, and cooperating means extending between each adjacent pair of ears, being connected to each ear thereof and being adapted to tighten or loosen said bracket upon the pole.

References Cited in the file of this patent

UNITED STATES PATENTS

| | | |
|---|---|---|
| 1,037,122 | Buffinger et al. | Aug. 27, 1912 |
| 1,849,789 | Coffing | Mar. 15, 1932 |
| 2,708,540 | Cook | May 17, 1955 |
| 2,761,643 | Ward et al. | Sept. 4, 1956 |

FOREIGN PATENTS

| | | |
|---|---|---|
| 376,969 | Germany | Dec. 21, 1921 |
| 904,505 | Germany | Feb. 18, 1954 |

OTHER REFERENCES

"Improved Design Transformer Mounts." Bulletin No. 651, published by Universal Pole Bracket Corporation, received May 14, 1956.

UNITED STATES PATENT OFFICE

CERTIFICATE OF CORRECTION

Patent No. 2,908,469                                           October 13, 1959

Jules A. Mack et al.

It is hereby certified that error appears in the printed specification of the above numbered patent requiring correction and that the said Letters Patent should read as corrected below.

Column 1, line 24, for "system" read -- systems --; column 7, line 33, after "bearing" and before the comma insert -- surface --; line 34, strike out "surface".

Signed and sealed this 19th day of April 1960.

(SEAL)
Attest:

KARL H. AXLINE                                                       ROBERT C. WATSON
Attesting Officer                                          Commissioner of Patents